United States Patent [19] [11] 3,668,155
Raley, Jr. [45] June 6, 1972

[54] SELF-EXTINGUISHING ETHYLENE COPOLYMER FOAMS COMPRISING A TERNARY MIXTURE OF AN ANTIMONY COMPOUND, A HALOGEN-CONTAINING COMPOUND AND A BROMINE COMPOUND

[72] Inventor: Charles Raley, Jr., Midland, Mich.
[73] Assignee: The Dow Chemical Company, Midland, Mich.
[22] Filed: June 27, 1968
[21] Appl. No.: 740,675

Related U.S. Application Data

[63] Continuation-in-part of Ser. No. 606,579, Jan. 3, 1967, abandoned.

[52] U.S. Cl. .................260/2.5 FP, 252/8.1, 260/2.5 E, 260/2.5 HA, 260/28.5 AV, 260/45.7 R, 260/45.7 PS, 260/45.7 P, 260/45.7 S, 260/45.75 R, 260/DIG. 24
[51] Int. Cl. .................C08f 15/02, C09k 3/28
[58] Field of Search.................252/8.1, 3; 106/15 FP; 161/403; 117/137; 260/2.5 R, 2.5 FP, 28.5 R, 28.5 AV, DIG. 24, 45.7 R, 45.7 PS, 45.7 P, 45.7 S, 45.75 R

[56] References Cited

UNITED STATES PATENTS

| | | | |
|---|---|---|---|
| 2,532,243 | 11/1950 | Ott | 260/2.5 |
| 2,590,211 | 3/1952 | Rugar | 252/8.1 X |
| 2,669,521 | 2/1954 | Bierly | 106/15 |
| 2,894,918 | 7/1959 | Killoran et al. | 260/2.5 |
| 2,962,464 | 11/1960 | Feild | 106/15 X |
| 2,986,535 | 5/1961 | Jacobson | 260/2.5 |
| 3,137,745 | 6/1964 | Johnstone | 260/2.5 X |
| 3,188,295 | 6/1965 | Ballast | 260/2.5 |
| 3,269,962 | 8/1966 | Eichorn | 260/2.5 |
| 3,331,797 | 7/1967 | Kopetz et al. | 260/28.5 |
| 3,194,854 | 7/1965 | Smith | 260/2.5 X |
| 3,558,532 | 1/1971 | Sundquist et al. | 260/2.5 |

Primary Examiner—John T. Goolkasian
Assistant Examiner—D. J. Fritsch
Attorney—Griswold & Burdick, Richard G. Waterman, Lloyd E. Hessenaur and Sidney J. Walker

[57] ABSTRACT

Compositions of the class of flame-retardant or self-extinguishing ethylene and vinyl alkanoate copolymer foams, useful as insulation, are described. Said foams are relatively lightly loaded with either a binary flame retardant mixture of (1) an antimony compound and (2) a halogen-containing aliphatic or cycloaliphatic compound of particular specificity or a ternary flame-retardant mixture including (1) and (2), and, (3) a bromine-containing aromatic or acyclic compound of particular specificity.

11 Claims, 1 Drawing Figure

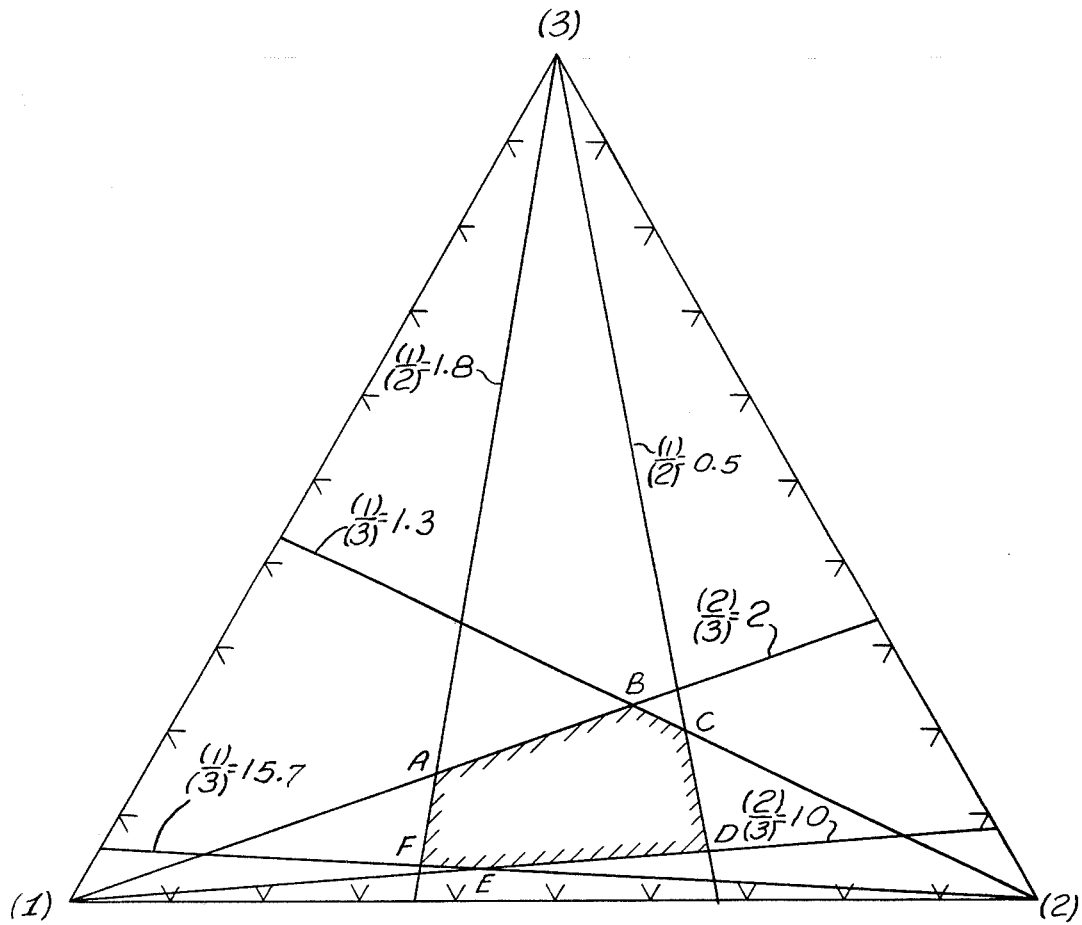

SELF-EXTINGUISHING ETHYLENE COPOLYMER FOAMS COMPRISING A TERNARY MIXTURE OF AN ANTIMONY COMPOUND, A HALOGEN-CONTAINING COMPOUND AND A BROMINE COMPOUND

The present invention is a continuation-in-part of copending application Ser. No. 606,579, filed Jan. 3, 1967 now abandoned.

This invention relates to flame-retardant or self-extinguishing ethylene copolymer foams.

It has been proposed heretofore to impart flame-retardancy to thermoplastic polymer compositions by incorporating various materials in the polymer. Flame-retardance has been obtained, for instance, by combining with the polymer a solid chlorinated hydrocarbon of high chlorine content such as chlorinated paraffin, and an inorganic flame-retardant substance such as antimony oxide in critical proportions to each other and to the polymer. Such compositions are described in U.S. Pat. Nos. 2,480,298; 2,590,211 and 2,669,521.

These prior art compositions are generally directed to the solid polymer but are not satisfactory for the making of flame-retardant and self-extinguishing foamed ethylene polymers.

Accordingly, it is a primary object of this invention to provide flame-retardant or self-extinguishing foamed ethylene copolymer compositions which are not heavily loaded with flame-retardant agents yet produce foamed products possessing highly satisfactory self-extinguishing times of about 3 or 4 seconds or less. Another object is to provide flame-retardant or self-extinguishing ethylene copolymer compositions which contain a smaller and more desirable concentration of flame-retardant agents than have the heretofore known flame-retardant ethylene polymer compositions.

I have now discovered that when 10 to 15 parts by weight of a mixture of flame-retardant agents containing in certain amounts (1) an antimony compound and (2) a halogen-containing aliphatic or cycloaliphatic compound having a hydrogen atom or halogen atom attached to a carbon atom alpha to a halogen-substituted carbon atom and containing from about 50 to 80 percent by weight of halogen, is intimately incorporated in 100 parts by weight of an ethylene copolymer foam, unexpectedly good self-extinguishing properties are obtained.

In addition, I have found that when 10 to 15 parts by weight of a ternary mixture of flame-retardant agents containing in certain amounts compounds (1) and (2) as well as (3) a bromine-containing aromatic or acyclic compound, said acyclic compound containing vinylic bromine or not having a hydrogen atom or bromine atom attached to a carbon atom alpha to a bromine-substituted carbon atom, is intimately incorporated in 100 parts by weight of the ethylene copolymer foam, unexpectedly good self-extinguishing properties are obtained.

In accordance with the present invention, the binary flame-retardant system incorporated in an ethylene copolymer foam contains the flame-retardant or self-extinguishing agents in a weight ratio range of between 0.5 to 1.0 and 1.5 to 1.0 inclusive of (1) to (2) and the ternary system contains the agents in the ratios within the area ABCDEF of the accompanying drawing.

The accompanying drawing is a trilinear diagram wherein the antimony compound is (1), the halogen-containing aliphatic or cycloaliphatic compound having a hydrogen atom or halogen atom attached to a carbon atom alpha to a halogen-substituted carbon atom and containing from about 50 to 80 percent by weight of halogen is (2), and the bromine-containing aromatic or acyclic compound, said acyclic compound containing vinylic bromine or not having a hydrogen atom or bromine atom attached to a carbon atom alpha to a bromine-substituted carbon atom is (3). The equations shown show the limiting ratios of the components (1), (2) and (3) within the area ABCDEF; for example: ½ = 0.5.

When the binary flame-retardant system is employed, the extreme weight limits of components (1) and (2) are from 3.3 to 9.0 parts by weight of (1) and from 4.0 to 10.0 parts by weight of (2) per 100 parts by weight of copolymer. These parts by weight are subject to the above defined weight ratio range. When the ternary flame-retardant system is employed, the extreme weight limits are from 2.7 to 9.4 parts by weight of (1), 2.5 to 9.9 parts by weight of (2), and from 0.3 to 3.6 parts by weight of (3), all per 100 parts by weight of copolymer. These parts by weight are subject to the above defined ratios within the area ABCDEF of the accompanying drawing.

Surprising as it may seen, use of either of the binary or ternary flame-retardant systems in admixture in the proportions herein prescribed provide uniquely superior and entirely unpredictable results. Thus, by preparing the foamed ethylene copolymer compositions of the invention, products of unexpectedly and significantly superior self-extinguishing properties are obtained.

The ethylene copolymers to be employed in the invention can be any normally solid resinous thermoplastic ethylene polymer such as copolymers of ethylene and from about 1 to about 30, preferably from about 3 to about 10, weight per cent of a vinyl alkanoate such as vinyl acetate, vinyl propionate, and vinyl butyrate, and copolymers of ethylene and from about 1 to about 30, preferably from about 3 to about 10, weight percent of a lower alkyl ($C_1$ to $C_4$) acrylate or methacrylate such as, for example, methyl acrylate, ethyl acrylate, propyl acrylate, isopropyl acrylate, butyl acrylate, methyl methacrylate and butyl methacrylate.

The antimony compounds useful in the practice of the invention include antimony trioxide, antimony pentoxide, antimony sulfide and the like.

The halogen-containing aliphatic or cycloaliphatic compounds having a hydrogen atom or halogen atom attached to a carbon atom alpha to a halogen-substituted carbon atom which can be used in the practice of the invention include the chlorine-containing self-extinguishing compounds such as hexachlorocyclohexane, a chlorinated paraffin wax containing between about 50 and 80 percent by weight of chlorine and the like, as well as the bromine-containing compounds such as pentabromomonochlorocyclohexane, hexabromocyclohexane, tris(2,3-dibromopropyl) 8c brominated polybutadiene latex and the like. Preferably, these compounds contain from 3 to 40 carbon atoms.

The bromine-containing compounds which can be used in the practice of the invention include aromatic compounds such as hexabromobenzene, pentabromomocochlorobenzene, tetrabromodichlorobenzene, tetrabromobenzene, pentabromophenol, tetrabromobisphenol-A, bis(pentabromophenyl) ether, and tribromophenol, as well as acyclic compounds having vinylic bromine or not having a hydrogen atom or bromine atom attached to a carbon atom alpha to a bromine-substituted carbon atom, such as pentaerythrityl tetrabromide, 2,2-bis(bromomethyl)-1-bromo-3-hydroxypropane, and the like. Preferably, the aromatic compounds contain from six to 12 carbon atoms in the aromatic ring structure, and the acyclic compounds contain from three to 15 carbon atoms.

In the practice of the present invention, a homogeneous mobile or flowable gel composition of a heat-plastified or molten normally solid ethylene copolymer, 10 to 15 parts per 100 parts of resin of either the binary or ternary flame-retardant mixture hereinbefore described, and a volatile organic foaming agent is formed under pressure and thereafter said composition is extruded into a zone of lower pressure sufficient to cause expansion of the extruded material with resultant formation of a flame-retardant foamed ethylene copolymer article composed for the most part of uniformly fine individually-closed thin-walled cells.

Small amounts, e.g. from 0.1 to 2 percent by weight of the ethylene copolymer, of additives such as aluminum stearate, zinc stearate, indigotin, blue copper phthalocyanine or other agents such as finely divided calcium silicate, diatomaceous earth, calcium carbonate, barium sulfate and the like can be employed advantageously as nucleating agents, but are not required in the invention.

The mobile or flowable gel is prepared by placing the ingredients under pressure of the foaming agent, suitably at temperatures above the crystalline melting point of the ethylene copolymer, e.g. at from 90° to 200° C., such as by heating the ingredients in admixture with one another in a pressure resistant vessel or an extruder until a homogeneous or substantially uniform flowable gel is obtained. Thereafter, the gel is extruded into a zone of sufficiently lower pressure such as the atmosphere to cause the extruded material to expand with resultant formation of a cellular or foamed body.

The gel is preferably extruded at a temperature near or above the melting point of the ethylene copolymer, but higher or lower temperatures can be used. The temperature at which the gel is extruded into the zone of lower pressure will vary depending in part upon the size and arrangement of the apparatus used, the rate of extrusion of the gel, the melting point of the ethylene copolymer and the proportion and kind of volatile organic foaming agent or other additives employed.

In general, the gel can be extruded at a temperature of from about 25° C. below the temperature at which crystallization of the ethylene copolymer causes an observable cloudiness in the gel, up to a temperature of 25° C. above the melting point of the ethylene copolymer. The temperature at which crystallization of the ethylene copolymer causes a cloudiness of the gel can be determined readily by a simple test such as by sealing weighed amounts of the ethylene copolymer and the foaming agent in a glass tube, heating the mixture to a temperature above the melting point of the ethylene copolymer to obtain a transparent uniform gel, then cooling or allowing the gel to cool and observing the temperature at which the gel becomes hazy or cloudy. The temperature at which an observable cloudiness of the gel occurs is hereinafter referred to as the "cloud point."

The pressure to be maintained on the gel prior to its extrusion in a zone of lower pressure should be at least as high as that of the vapor pressure of the volatile organic foaming agent and sufficient to prevent foaming in the extruder or discharge orifice. Pressures of from about 300–2,000 pounds per square inch or higher, gauge pressure, can be used.

The volatile organic foaming agent should be a non-solvent or poor solvent for the ethylene copolymer such as 1,2-dichlorotetrafluoroethane, dichlorodifluoromethane, isobutane, methyl chloride, 1,1,1-trifluoroethane, ethylidene fluoride, perfluoropropane, 2,2-difluoropropane, each alone or mixtures thereof, and the like, but one that dissolves in the polymer in an amount up to about 30 percent by weight sufficient to form a mobile or flowable gel and expand the extruded gel to produce a cellular or foamed body. The foaming agent can be employed in amounts from 0.05 to 0.5 gram mole per 100 grams of the ethylene copolymer.

In practice, the flame-retardant ethylene copolymer foams can be prepared by feeding solid granules of the ethylene copolymer together with the binary or ternary flame-retardant mixture in the desired proportion, into the feed hopper of a plastic extruder wherein the polymeric material is pressed and heated to its melting temperature and is forwarded by means of the screw into a mixing and blending zone wherein the heat-softened material is blended under pressure with a volatile organic foaming agent such as 1,2-dichlorotetra-fluoroethane also fed to the mixing and blending zone of the extruder. The resulting mixture is blended into a homogeneous mobile gel and is brought to a temperature between about 90° and 200° C., preferably from 90°–120° C., then is extruded into a zone of lower pressure, suitably the atmosphere, wherein the extruded material expands with resultant formation of a foam of substantially uniform fine individually closed thin-walled cells.

An alternative method of foaming the composition is to incorporate a decomposable blowing agent such as azodicarbonamide, benzene sulfonyl hydrazide, oxybis benzene sulfonyl hydrazide, ammonium carbonate, N,N'-dinitroso N,N'-dimethyl terephthaamide, and the like, in the polymer composition along with the flame-retardant additives, heating the mixture above the softening point of the polymer to the decomposition point of the blowing agent, and permitting the liberated gas to expand the polymer composition into a foamed state.

The flame-retardant foamed ethylene copolymers of the invention are useful as insulation, in packaging application, for forming gaskets, as sealant backers in certain types of construction, etc.

The following non-limiting examples serve to illustrate my invention.

EXAMPLE I

One hundred parts by weight of a copolymer of ethylene and 4 weight percent vinyl acetate having a melt index of 2, together with 7.5 parts by weight of antimony trioxide and 7.5 parts by weight of chlorinated paraffin wax containing about 70 percent chlorine was compounded thoroughly at a temperature of 250°–300° F. in a Banbury mixer then cooled and ground up into fine particles. The compounded mixture was fed into a plastics extruder at a rate corresponding to 5 pounds of the mixture per hour. The plastics extruder employed in the experiment comprised a barrel having a 1¼ inch diameter screw equipped with a mixing head similar in design to that described in U.S. Pat. No. 2,453,088 and a sealing plate positioned mid-way of the screw. An inlet to the barrel of the extruder was provided adjacent to the sealing plate for feed of a volatile organic compound as blowing agent into the barrel and into the heat-plastified ethylene copolymer. The sealing plate formed a constricted passageway between the rim of the plate and the bore of the barrel so that flow of the heat-plastified ethylene copolymer through the constricted passageway by pressure of the flights of the screw formed an effective plastic seal against counter-current flow or leakage of the volatile organic compound from the extruder. The heat-plastified ethylene-vinyl acetate copolymer formulation was forwarded under pressure of the screw around the sealing plate and into the second section of the barrel of the extruder wherein it was mixed with 1,2-dichlorotetrafluoroethane as a foaming agent fed thereto at a rate of 0.9 pounds per hour. The resulting mixture was blended under pressure, e.g. 500–600 pounds per square inch gauge, principally by action of the mixing head on the screw of the extruder, into a uniform gel composition and was brought to a temperature between 100° and 110° C., then forced through a discharge orifice of ¼ × ⅛ inch cross-section into the atmosphere. The extruded material was allowed to expand freely in the air. The ethylene-vinyl acetate copolymer foam product was a cellular oval rod having a cross-section of 18 × 13 mm. and was composed of substantially uniform fine individually-closed thin-walled cells. The foam had a density of about 2.7 pounds per cubic foot.

The product was tested for its self-extinguishing properties by the following procedure: a sample of the product was inclined at a 30° angle below the horizontal while in a draft-free enclosure; a gas flame 1-inch high was applied to the lower end of the sample until it was ignited; the flame was then removed. The time for the ignited foam to extinguish itself was measured; this procedure was repeated a plurality of times on the foam. The self-extinguishing times reported are the average of 34 tests.

The ethylene-vinyl acetate copolymer foam had a self-extinguishing time of 1.1 seconds.

A polyethylene foam prepared and tested under similar conditions and containing 8 parts per 100 parts of polymer of antimony trioxide and 8 parts of chlorinated paraffin wax containing about 70 percent by weight of chlorine had a self-extinguishing time of 10.1 seconds.

EXAMPLE II

Following the same procedure as in Example I, a flame-retardant foam composition according to the invention of a copolymer of ethylene and 4 weight percent vinyl acetate was prepared except for using 6.5 parts per 100 parts of polymer of antimony trioxide and 6.5 parts per 100 parts of polymer of chlorinated paraffin wax containing about 70 percent chlorine. A self-extinguishing time of 2 seconds was obtained.

EXAMPLE III

Following the same procedure as in Example I, a flame-retardant foam composition according to the invention of a copolymer of ethylene and 4 weight percent vinyl acetate was prepared except for using 5.5 parts per 100 parts of polymer of antimony trioxide and 5.5 parts per 100 parts of polymer of chlorinated paraffin wax containing about 70 percent chlorine. A self-extinguishing time of 3.9 seconds was obtained.

EXAMPLE IV

Following the same procedure as in Example I, a flame-retardant foam composition according to the invention of a copolymer of ethylene and 4 weight percent vinyl acetate was prepared except for using a ternary flame-retardant mixture containing 7.5 parts per 100 parts of polymer of antimony trioxide, 5 parts per 100 parts of polymer of chlorinated paraffin wax containing about 70 percent chlorine, and 2.5 parts per 100 parts of polymer of hexabromobenzene. A self-extinguishing time of 1.4 seconds was obtained.

EXAMPLE V

Following the same procedure as in Example I, a flame-retardant foam composition according to the invention of a copolymer of ethylene and 4 weight percent vinyl acetate was prepared except for using a ternary flame-retardant system containing 7.5 parts per 100 parts of polymer of antimony trioxide, 6.25 parts per 100 parts of polymer of chlorinated paraffin wax containing about 70 per cent chlorine, and 1.25 parts per 100 parts of polymer of hexabromobenzene. A self-extinguishing time of 0.5 second was obtained.

EXAMPLE VI

Following the same procedure as in Example I, a flame-retardant foam composition according to the invention of a copolymer of ethylene and 4 weight percent vinyl acetate was prepared except for using a ternary flame-retardant system containing 6.6 parts per 100 parts of polymer of antimony trioxide, 4.4 parts per 100 parts of polymer of chlorinated paraffin wax containing about 70 per cent chlorine, and 2.2 parts per 100 parts of polymer of hexabromobenzene. A self-extinguishing time of 1.4 seconds was obtained.

EXAMPLE VII

Following the same procedure as in Example I, a flame-retardant foam composition according to the invention of a copolymer of ethylene and 4 weight percent vinyl acetate was prepared except for using a ternary flame-retardant system containing 6.6 parts per 100 parts of polymer of antimony trioxide, 5.5 parts per 100 parts of polymer of chlorinated paraffin wax containing about 70 percent chlorine, and 1.1 parts per 100 parts of polymer of hexabromobenzene. A self-extinguishing time of 0.9 second was obtained.

EXAMPLE VIII

Following the same procedure as in Example I, a flame-retardant foam composition according to the invention of a copolymer of ethylene and 20 weight percent ethyl acrylate is prepared except for using a binary flame-retardant mixture containing 7.8 parts of hexachlorocyclohexane per 100 parts of polymer and 3.9 parts of antimony trioxide per 100 parts of polymer. A self-extinguishing time of 3 seconds is obtained.

EXAMPLE IX

Following the same procedure as in Example I, a flame-retardant foam composition according to the invention of a copolymer of ethylene and 2.5 weight percent vinyl acetate was prepared except for using a binary flame-retardant system containing 4.26 parts per 100 parts of polymer of antimony trioxide and 3.97 parts per 100 parts of polymer of chlorinated paraffin wax containing about 70 percent chlorine. A self-extinguishing time of 1.1 seconds was obtained.

I claim:

1. A foamed ethylene copolymer article containing a mixture of self-extinguishing agents consisting essentially of (1) an antimony compound selected from the group consisting of antimony trioxide, antimony pentoxide and antimony sulfide and (2) a halogen-containing aliphatic or cycloaliphatic compound having a hydrogen atom or halogen atom attached to a carbon atom $\alpha$ to a halogen substituted carbon atom and containing from 50 to 80 weight percent of halogen, characterized in that the copolymer composition is a copolymer of ethylene and from 1 to 30 weight percent of a vinyl alkanoate or a lower alkyl acrylate or methacrylate, a third component (3) a bromine-containing aromatic or acylic compound which has vinylic bromine or does not have a hydrogen or halogen atom attached to a carbon atom $\alpha$ to a bromine-substituted carbon atom, in which case the components of the ternary mixture of self-extinguishing agents are present in the proportions which lie within the area ABCDEF of the accompanying drawing, the mixture of self-extinguishing agents being present in an amount of from 10 to 15 parts by weight per 100 parts of the copolymer and components (1) and (2) having a weight ratio range of between 0.5 to 1.0 and 1.5 to 1.0, inclusive, of (1) to (2).

2. The article of claim 1, wherein the polymer contains from 3 to 30 weight percent of vinyl acetate or ethyl acrylate.

3. The article of claim 1, wherein the halogen of compound (2) is chlorine or bromine.

4. The article of claim 3, wherein the compound of (2) contains from 3 to 40 carbon atoms.

5. The article of claim 1, wherein the aromatic compound of (3) contains from six to 12 carbon atoms in the aromatic ring structure, and the acyclic compound of (3) contains from three to 15 carbon atoms.

6. The article of claim 1, wherein the compound of (2) contains from three to 40 carbon atoms and the halogen is chlorine or bromine, the aromatic compound of (3) contains from six to 12 carbon atoms in the aromatic ring structure, and the acyclic compound of (3) contains from three to 15 carbon atoms.

7. The article of claim 1, wherein the antimony compound is antimony trioxide.

8. The article of claim 1, wherein the compound of (2) is chlorinated paraffin wax containing about 70 percent chlorine.

9. The article of claim 1, wherein the compound of (3) is hexabromobenzene.

10. The article of claim 1 which contains 7.5 parts by weight of antimony oxide, 6.25 parts by weight of chlorinated paraffin wax containing about 70 percent chlorine, and 1.25 parts by weight of hexabromobenzene.

11. A foamed ethylene copolymer article containing a mixture of self-extinguishing agents consisting essentially of (1) an antimony oxide selected from the group consisting of antimony trioxide, antimony pentoxide and antimony sulfide, and (2) a member selected from the group consisting of: a chlorinated paraffin wax containing between about 50 and 80 percent by weight chlorine, hexachlorocyclohexane, pentabromomonochlorocyclohexane, hexabromocyclohexane, tris(2,3-dibromopropyl)phosphate and brominated polybutadiene latex, characterized in that the copolymer composition is a copolymer of from about 99 to 70 weight percent ethylene and from 1 to 30 weight percent of a vinyl alkanoate or a lower alkyl acrylate or methacrylate, and components (1) and (2) being present in a weight ratio between 0.5 to 1 and 1.5 to 1, inclusive, of (1) and (2), a third component (3) a bromine compound selected from the group consisting of hexabromobenzene, pentabromomonochlorobenzene, tetrabromodichlorobenzene, tetrabromobenzene, pentabromophenol, tetrabromobisphenolbA, bis(pentabromophenyl)ether and tribromophenol, acyclic compounds having vinylic bromine or not having a hydrogen atom or bromine atom attached to a carbon atom $\alpha$ to a bromine-substituted carbon atom, such as pentaerythrityl tetrabromide, 2,2-bis(bromomethyl)-1-bromo-3-hydroxy-propane and the like, and (1), (2) and (3) are present in proportions which lie within the area ABCDEF of the accompanying drawing, the mixture of self-extinguishing agents (1), (2) and (3) being present in an amount of from about 10 to 15 parts by weight per 100 parts by weight of the copolymer.

* * * * *